United States Patent [19]

Fukuda et al.

[11] Patent Number: 5,531,459
[45] Date of Patent: Jul. 2, 1996

[54] GROMMET FOR WIRE HARNESS WITH INNER SURFACE HAVING DENSELY ARRANGED PROJECTIONS OR PLATEAUS

[75] Inventors: Minoru Fukuda; Hiroyuki Ochi; Takaaki Fukui, all of Yokkaichi, Japan

[73] Assignee: Sumitomo Wiring Systems, Ltd., Yokkaichi, Japan

[21] Appl. No.: 360,055

[22] Filed: Dec. 20, 1994

[30] Foreign Application Priority Data

Dec. 27, 1993 [JP] Japan .................. 5-074632 U

[51] Int. Cl.⁶ .................. F16J 15/14; H01B 17/26
[52] U.S. Cl. .................. 277/178; 174/152 G; 174/153 G
[58] Field of Search .................. 277/1, 728 M, 277/178, 272 FB; 174/153 G, 152 G

[56] References Cited

U.S. PATENT DOCUMENTS

| | | | |
|---|---|---|---|
| 3,243,240 | 3/1966 | Arthur | 277/178 |
| 3,518,359 | 6/1970 | Trimble et al. | 173/153 G |
| 4,268,041 | 5/1981 | Sovish et al. | 277/1 |
| 4,731,501 | 3/1988 | Clark et al. | 277/212 FB |
| 4,959,509 | 9/1990 | Takeuchi et al. | 277/178 |

FOREIGN PATENT DOCUMENTS

| | | | |
|---|---|---|---|
| 2686671 | 7/1993 | France | 277/212 FB |
| 61-66713 | 3/1989 | Japan . | |
| 557328 | 11/1943 | United Kingdom | 174/153 G |

Primary Examiner—Scott W. Cummings
Attorney, Agent, or Firm—Oliff & Berridge

[57] ABSTRACT

A wire harness grommet has a funnel-like shape having a wire-passing tubular portion of a small diameter, and a partition wall-mounting portion extending from the tubular portion. The bonding between a filler layer, which is provided in a hollow portion of the funnel-shaped portion, and an inner wall surface is enhanced to thereby prevent the separation of the filler layer. Removal of the grommet from a mold can be effected satisfactorily. The inner wall surface is in the form of tiling in which flat plateaus are densely arranged and spaced from one another by joint grooves, so that the inner wall surface serves as a separation prevention surface.

7 Claims, 2 Drawing Sheets

GROMMET FOR WIRE HARNESS WITH INNER SURFACE HAVING DENSELY ARRANGED PROJECTIONS OR PLATEAUS

BACKGROUND OF THE INVENTION

This invention relates to a wire harness grommet that is mounted on a wire harness passing through a partition wall of a vehicle body or equipment. The grommet is mounted on the partition wall to hold the wire harness in a manner so as to keep the posture of passage of the wire harness straight and orderly, and also to achieve a waterproof effect.

A grommet for a wire harness has a funnel-like shape, and includes a wire-passing tubular portion having a small diameter for passing the wire harness therethrough in pressurized contact with the tubular portion. An annular partition wall-mounting portion having a large diameter is fitted in a through hole in a partition wall of a vehicle body or equipment. The wire harness is passed through the wire-passing tubular portion, and then a filler layer is formed in a hollow portion formed between the outer periphery of the thus-passed wire harness and the funnel-like inner wall surface of the grommet, thereby mounting the grommet on the vehicle body or the like.

However, because the wire harness is subjected to external tension and bending force during use, the filler layer is separated from the inner wall surface (to which the filler layer is bonded) to form a gap, so that the waterproof and dust prevention function achieved by the filler layer may be lost. To overcome this difficulty, there has been proposed a wire harness grommet (disclosed in Japanese Utility Model Unexamined Publication No. 1-66713) in which projections or recesses, serving as means for preventing the separation of a filler layer, are formed on a funnel-like inner wall surface.

In the above construction having the separation prevention means, in order to effectively prevent the separation of the filler layer due to an external force exerted on the wire harness, it is necessary that the projections or recesses have a considerable size. Therefore, when removing the molded grommet from a mold, a considerable mold release resistance is encountered, thus affecting mold release characteristics. Moreover, the projections or recesses may be damaged. Therefore, its configuration is limited to one compatible with the mold release characteristics, and this results in a disadvantage that the separation prevention function is not sufficiently achieved, and hence is not practical.

SUMMARY OF THE INVENTION

It is an object of this invention to provide a grommet for a wire harness that overcomes the above disadvantages of the prior art, and provides a good release prevention effect for a filler, and is excellent in mold release characteristics.

In order to overcome the above technical problems, the present invention provides a grommet for a wire harness including a wire-passing tubular portion having a first diameter, and a partition wall-mounting portion having a diameter larger than the first diameter. The partition wall-mounting portion extends from the tubular portion, so that the grommet has a funnel-like configuration. A funnel-shaped inner wall surface has densely-arranged projections or plateaus spaced from one another by grooves. Alternatively, the inner wall surface may be in the form of a rugged configuration that includes densely-arranged fine projections produced by knurling, tiling or wrinkling. The rugged surface configuration is applied to the whole or part of the inner wall surface.

According to a second aspect of the present invention, there is provided a grommet for a wire comprising a funnel-like body having a cylindrical portion and a conical portion connected to the cylindrical portion. The conical portion includes an inner surface provided with a plurality of densely-arranged grooves. A filling element disposed within the conical portion engages with the grooves.

According to a third aspect of the present invention, there is provided a method of making a grommet having a funnel-like shape. The method includes injecting a material into a mold configured to produce a grommet having a plurality of densely-arranged grooves on an inner surface of said grommet, the grooves facilitating removal of the material from the mold after the material has solidified; and removing the material from the mold, the material having solidified to form the grommet.

BRIEF DESCRIPTION OF THE DRAWINGS

The invention will be described in detail with reference to the following drawings, wherein.

DETAILED DESCRIPTION OF PREFERRED EMBODIMENTS

Figure 1A:
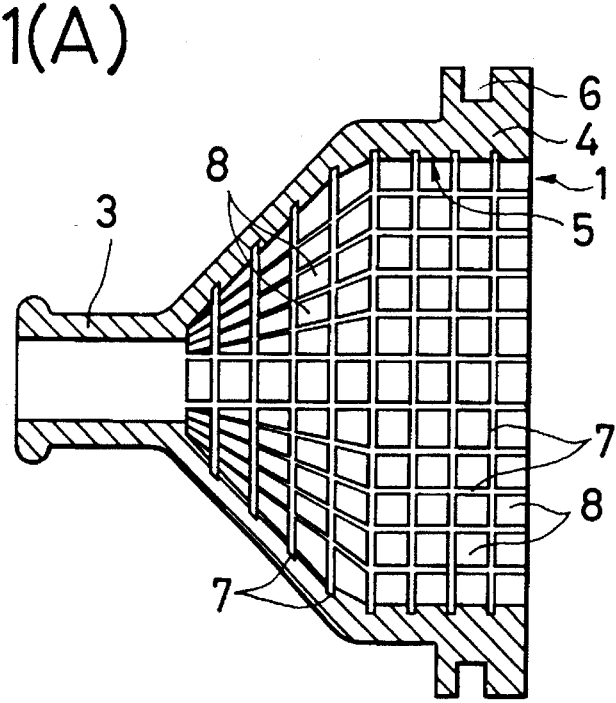
FIG. 1(A) is a front, cross-sectional view of a first embodiment of a wire harness grommet of the present invention.
Figure 1B:
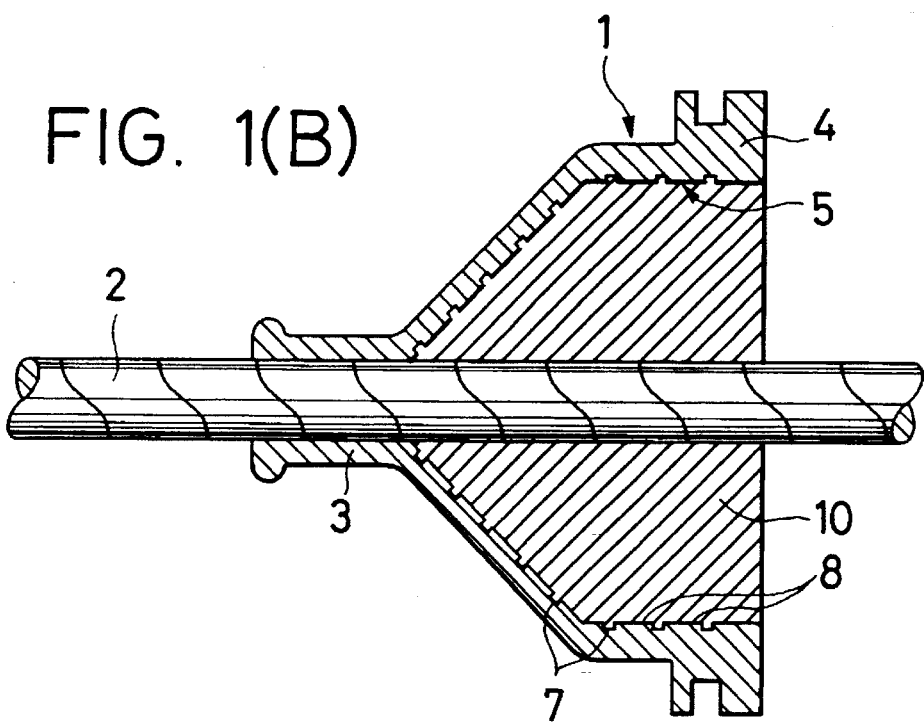
FIG. 1(B) a front, cross-sectional view of the grommet in use.

A first embodiment of the invention will now be described in detail with reference to FIGS. 1(A)–(B). A funnel-like grommet 1 for a wire harness includes a wire-passing tubular portion 3 having a relatively small diameter for passing the wire harness 2 therethrough, and a partition wall-mounting portion 4 having a larger diameter that extends from the tubular portion 3. The grommet 1 has a peripheral fitting groove 6 for accommodating a through hole in a partition wall of a vehicle body. A funnel-shaped inner wall surface 5, except for an inner wall surface of the wire-passing tubular portion 3, is formed into a separation prevention wall surface having densely-arranged flat plateaus 8 spaced from one another by shallow joint grooves 7, similar to the spacing between tiles. A filler, for example, formed by adding a curing agent to a urethane resin, is poured into the inner wall surface to fill a filler layer 10 in a hollow portion between the outer periphery of the passed wire harness 2 and the inner wall surface 5.

Figure 2:
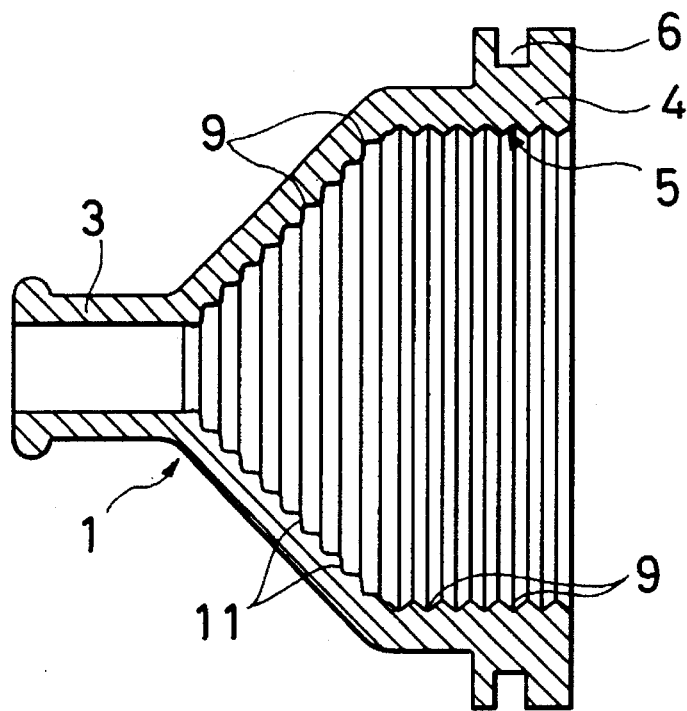
FIG. 2 is a front, cross-sectional view of another embodiment of a wire harness grommet of the invention.
Figure 3:
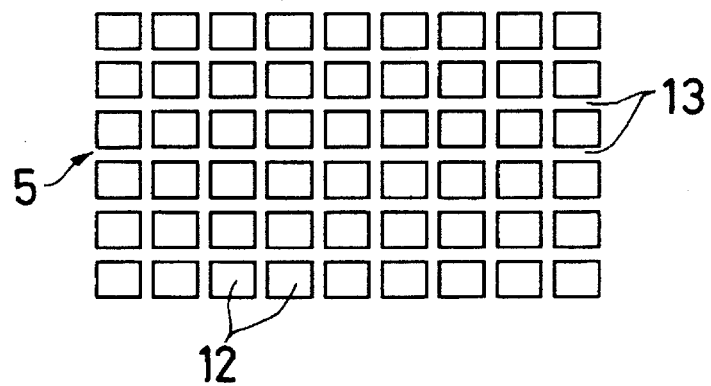
FIG. 3 is an enlarged view of a portion of an inner wall surface of a further embodiment of a wire harness grommet of the invention.

Other embodiments of the present invention will be described with reference to FIGS. 2 and 3. First, in FIG. 2, an inner wall surface 5 has wrinkles, and wrinkle crests 11 define projections while wrinkle grooves 9 define grooves. The wrinkle grooves 9 are arranged at a small pitch in a continuous manner. In FIG. 3, an inner wall surface 5 is formed into a rugged surface having fine projections 12 (the size of the fine projections 12 is 2~3 mm) spaced from one another by grooves 13.

In each of the above embodiments, the depth of the grooves need only to be 0.3~1.0 mm, and the total length of the grooves is very long. Therefore, the effective separation prevention effect can be achieved, and the mold release characteristics are not lowered to such an extent as to adversely affect the practical use.

As described above, the wire harness grommet of the present invention provides a good separation prevention effect for the filler layer, and has good mold release characteristics, and is excellent in practical use.

In the grommet of the invention for a wire harness, the inner wall surface filled with a filler has the above configuration, so that the area of contact between the filler and the inner wall surface is increased, thus providing a strong bonding force. The grooves, by which the projections or plateaus are spaced, serve to offer a resistance to the separation of the filler. The total length of the grooves in the single grommet is considerably long, and therefore even when the filler layer receives an external tension or bending force exerted on the wire harness, the external force is sufficiently received by the portion of connection between the filler layer and the inner wall surface, and therefore the filler layer will not be easily separated.

The depth of the grooves is small, and therefore a mold release resistance, which is produced when removing the grommet of rubber from a mold, is reduced so that the mold release characteristics are not lowered to such an extent as to adversely affect the practical use.

The invention has been described in detail with reference to preferred embodiments thereof, which are intended to be illustrative, not limiting. Various modifications can be made without departing from the spirit and scope of the invention as set forth in the appended claims.

What is claimed is:

1. A funnel-shaped grommet for a wire harness, comprising:
   a wire-contacting tubular portion having a first diameter; and
   a partition wall-mounting portion having a second diameter larger than the first diameter, said partition wall-mounting portion extending from said tubular portion, wherein a funnel-shaped inner wall surface of the partition wall-mounting portion has one of projections and plateaus densely-arranged and spaced from one another by grooves.

2. The grommet of claim 1, wherein said inner wall surface is rugged.

3. The grommet of claim 1, wherein said inner wall surface includes a tiled pattern.

4. The grommet of claim 1, wherein said inner wall surface is wrinkled.

5. A grommet for a wire comprising:
   a funnel-like body having a wire-contacting cylindrical portion and a conical portion connected to the cylindrical portion, said conical portion including an inner surface provided with a plurality of densely-arranged grooves; and
   a filling element disposed within said conical portion, said filling element engaging with said wire and said grooves.

6. The grommet of claim 5, wherein said grooves have a depth between about 0.3–1.0 mm.

7. The grommet of claim 5, further comprising projections positioned between said grooves, said projections having a height between about 2–3 mm.

* * * * *